H. H. RUNG.
TIRE PUMP ATTACHMENT.
APPLICATION FILED SEPT. 7, 1907.

944,213.

Patented Dec. 21, 1909.

Witnesses:—

Inventor
Harry H. Rung
by his Attorneys
Howson & Howson

UNITED STATES PATENT OFFICE.

HARRY H. RUNG, OF PHILADELPHIA, PENNSYLVANIA, ASSIGNOR OF ONE-HALF TO ROBERT F. WHITMER, OF PHILADELPHIA, PENNSYLVANIA.

TIRE-PUMP ATTACHMENT.

944,213.     Specification of Letters Patent.     Patented Dec. 21, 1909.

Application filed September 7, 1907. Serial No. 391,828.

*To all whom it may concern:*

Be it known that I, HARRY H. RUNG, a citizen of the United States, residing in Philadelphia, Pennsylvania, have invented certain Improvements in Tire-Pump Attachments, of which the following is a specification.

The object of my invention is to provide means readily attachable to or detachable from an automobile or other vehicle whereby the tires may be inflated by the engine of the vehicle through the medium of one of the wheels.

Figure 1:
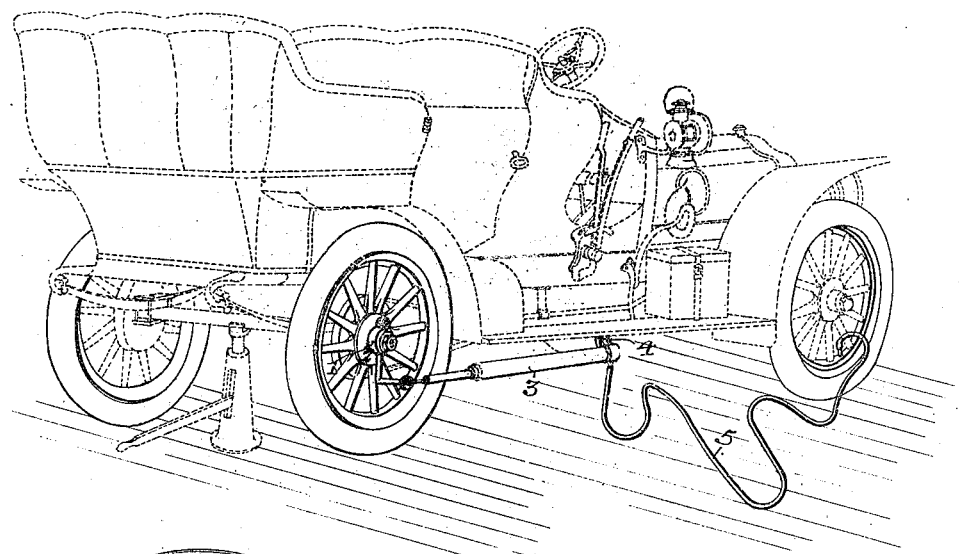
Figure 2:
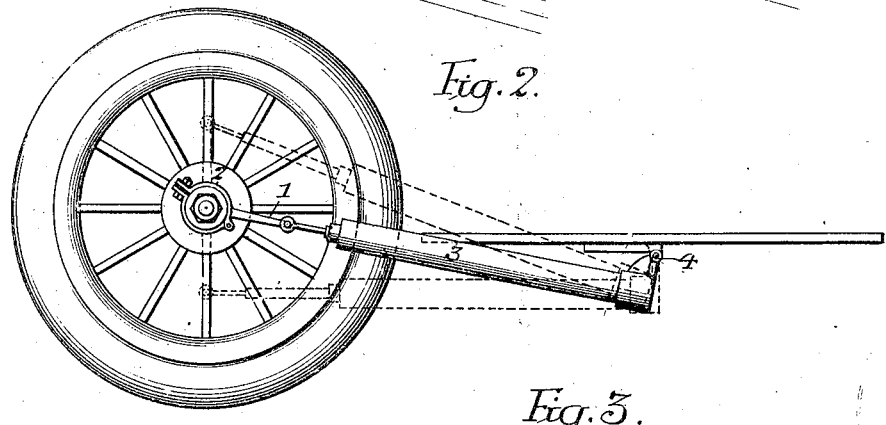
Figure 3:
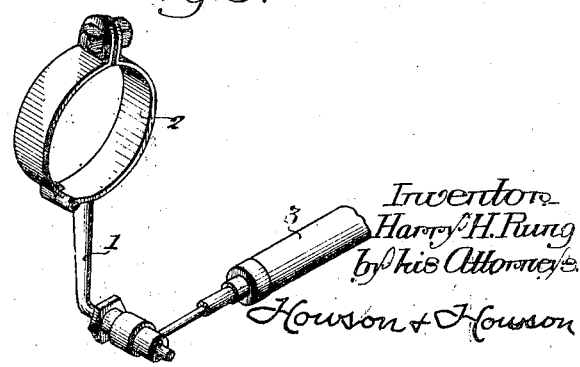

My invention is fully shown in the accompanying drawings, in which:

Figure 1, is a perspective view, showing an automobile in dotted lines, the tires being however in full lines, and having my attachment in proper operative relation thereto; Fig. 2, is an enlarged view of the structure, and Fig. 3, is a perspective view of the connection forming the subject of my invention.

In carrying my invention into effect, I jack up one of the rear wheels of the automobile and connect to the same a crank arm 1 by means of a split collar 2. To the running board of the vehicle a pump 3 is hinged at 4, and the piston of this pump is connected to said crank arm. From the opposite end of the pump cylinder a hose 5 may extend to the several wheels, in the present instance being shown as connected to pump up the front tire. When the pump has been connected in the manner shown in Fig. 1, it is only necessary to start the engine, when, through the gearing usually employed, the jacked-up wheel will be driven and with it the crank arm, thereby driving the piston of the pump, whose cylinder will partake of the necessary motion without providing a slotted connection. After three tires have been pumped up the automobile is dropped onto all four wheels, and the pump is connected to the other rear wheel from which it may be driven as above described to fill the tire of the wheel which did the first work.

I claim:

1. The combination with a traction wheel of an automobile, of a crank arm detachably connected to the same, a pump cylinder detachably hinged to the automobile, a piston in said cylinder connected to said crank arm, and a hose leading from said pump to the tire of a wheel whereby said tire may be inflated by driving the wheel to which the crank arm is attached.

2. The combination with a traction wheel of an automobile, of a crank arm detachably connected to the hub of the same, a pump cylinder detachably hinged to the automobile, a piston in said cylinder operatively connected to said crank arm, and a hose leading from said pump to the tire of a wheel whereby said tire may be inflated by driving the wheel hub to which the crank arm is attached.

3. The combination with a traction wheel of an automobile having a detachable crank pin, a pump cylinder detachably hinged to the automobile, a piston in said cylinder connected to said crank pin, and a hose leading from said pump to the tire of a wheel of the automobile whereby said tire may be inflated by driving the wheel having the detachable crank pin.

4. The combination with a traction wheel of an automobile, of a crank pin detachably connected to the same, a pump cylinder pivotally supported at a fixed distance from the axis of said wheel, a piston in said cylinder connected to said crank pin, and a hose leading from the pump to the tire of a wheel.

5. The combination with a traction wheel, of an automobile, of a crank pin detachably connected to the same, a pump cylinder pivotally supported on the automobile at a fixed distance from the axis of said wheel, a piston in said cylinder connected to said crank pin, and a hose leading from the pump to the tire of a wheel.

In testimony whereof, I have signed my name to this specification, in the presence of two subscribing witnesses.

HARRY H. RUNG.

Witnesses:
M. M. DALY,
PAUL O. KIRSCHMANN.